(12) United States Patent
Kuropatwinski

(10) Patent No.: US 11,393,485 B2
(45) Date of Patent: Jul. 19, 2022

(54) METHOD OF ENHANCING DISTORTED SIGNAL, A MOBILE COMMUNICATION DEVICE AND A COMPUTER PROGRAM PRODUCT

(71) Applicant: MED-EL ELEKTROMEDIZINISCHE GERÄTE GMBH, Innsbruck (AT)

(72) Inventor: Marcin Kuropatwinski, Gdansk (PL)

(73) Assignee: MED-EL ELEKTROMEDIZINISCHE GERÄTE GMBH, Innsbruck (AT)

(*) Notice: Subject to any disclaimer, the term of this patent is extended or adjusted under 35 U.S.C. 154(b) by 125 days.

(21) Appl. No.: 16/763,379

(22) PCT Filed: Nov. 13, 2018

(86) PCT No.: PCT/EP2018/081128
§ 371 (c)(1),
(2) Date: May 12, 2020

(87) PCT Pub. No.: WO2019/096807
PCT Pub. Date: May 23, 2019

(65) Prior Publication Data
US 2020/0321016 A1 Oct. 8, 2020

(30) Foreign Application Priority Data
Nov. 14, 2017 (EP) .................................. 17201500

(51) Int. Cl.
*G10L 21/0208* (2013.01)
*G06N 20/00* (2019.01)
*G06F 17/18* (2006.01)
*G06N 5/02* (2006.01)

(52) U.S. Cl.
CPC .......... *G10L 21/0208* (2013.01); *G06F 17/18* (2013.01); *G06N 5/02* (2013.01); *G06N 20/00* (2019.01)

(58) Field of Classification Search
None
See application file for complete search history.

(56) References Cited

U.S. PATENT DOCUMENTS

| 2003/0061037 | A1* | 3/2003 | Droppo | G10L 21/0208 |
| | | | | 704/226 |
| 2014/0200887 | A1* | 7/2014 | Nakadai | G10L 15/20 |
| | | | | 381/61 |

* cited by examiner

*Primary Examiner* — Quynh H Nguyen
(74) *Attorney, Agent, or Firm* — Browdy and Neimark, PLLC

(57) ABSTRACT

A method of enhancing distorted signal having a speech and noise component, with a processing device having memory with stored training information T, comprising a step of removing noise in spectrum domain according to a noise and speech model to obtain a clear signal spectrum, wherein the training information T comprises dictionaries of compact spectra prototypes of speech and noise, speech gains and noise gains forming together composite states and it comprises probabilities of state history. Dictionaries of compact spectra prototypes comprise compact spectra prototypes of a first dimension $P_1$ and of a second dimension $P_2$ where second dimension $P_2$ is higher or equal to the first dimension $P_1$. A mobile communication device having a battery and processing device with connected memory, radio transceiver and audio input, according to the invention is adapted to receive audio signal from audio input and execute the method according to the invention on this signal and then transmit this signal with radio transceiver. A computer program product according to the invention when executed by mobile communicating device causes execution of the method according to the invention.

15 Claims, 4 Drawing Sheets

Figure 1:
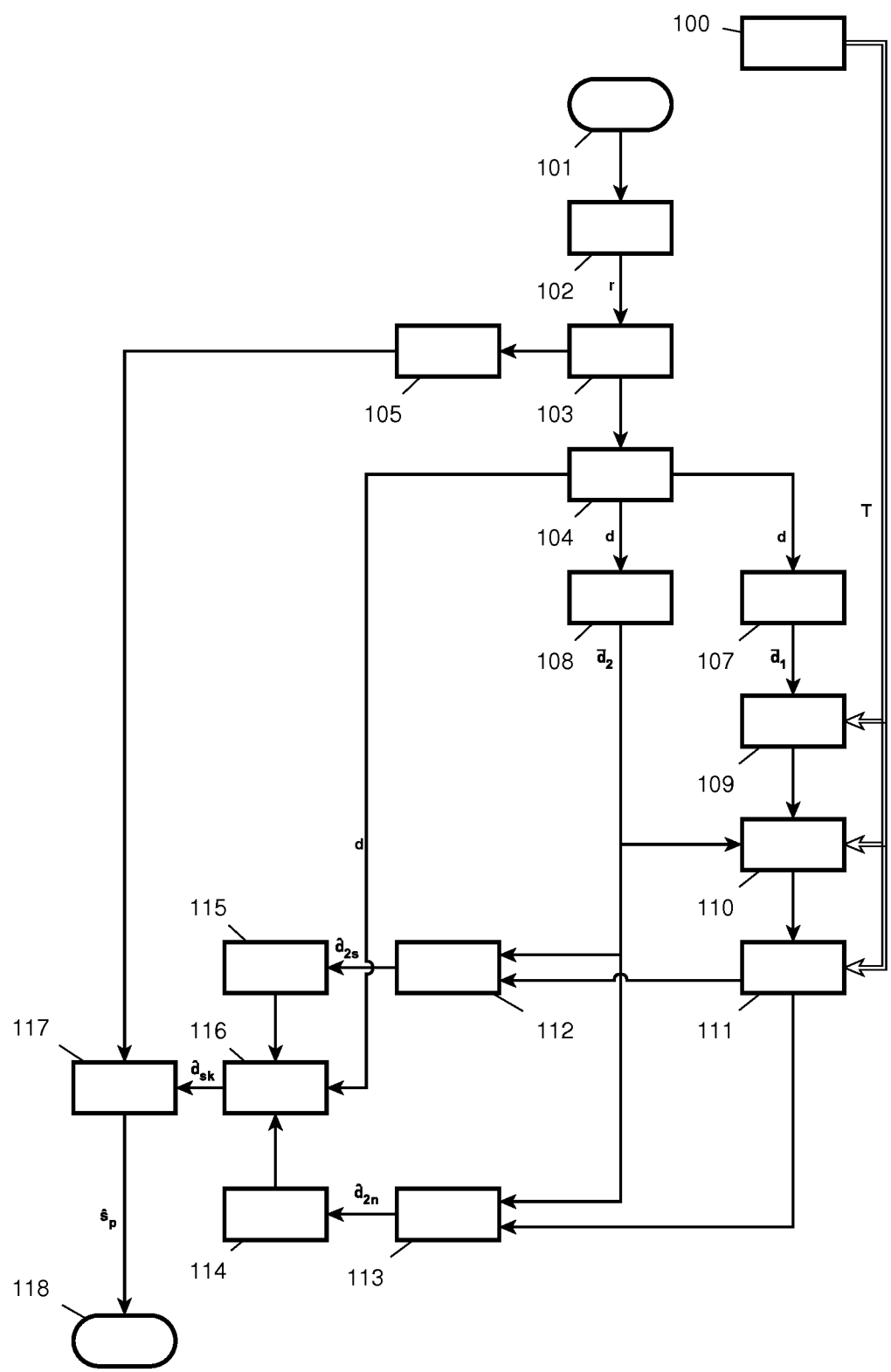

METHOD OF ENHANCING DISTORTED SIGNAL, A MOBILE COMMUNICATION DEVICE AND A COMPUTER PROGRAM PRODUCT

The invention concerns a method of enhancing distorted signal, having a speech and noise component, a mobile communication device adapted to carry on this method and respective computer program product.

Telecommunication devices, in particular telephones, smartphones or a hearing aid apparatuses are often used in noisy environment such as outdoors, transportation means interiors, offices or public areas, contaminated with various kind of noises including air-conditioning noise, wind noise, crying children, people conversations, engine sounds or music. These communication devices quite often does not only serve to transmit audio signals but also are equipped with speech recognition systems providing at least limited control over device with audio signal. Consequently noise present in incoming audio signals not only contributes to reduction of quality of transmission but also significantly diminishes functionality of the device. Therefore, noise reduction systems are significant issue.

Acoustics noises and interferences mentioned above are of time varying non-stationary character and hence, at a given time instant there is large uncertainty about noise frequency spectrum. Consequently applicability of conventional filtration and adaptive filtration techniques is severely limited. To compensate this uncertainty the a'priori knowledge about speech and noise signals is often used. This a priori knowledge is based on the past observation—forming so called training sets that is training set means time sequence of spectra.

A priori knowledge model is a probabilistic state model, that gives good results in time variable disturbances regime as disclosed by Deng, F., et al. (2015). "Sparse Hidden Markov Models for Speech Enhancement in Non-Stationary Noise Environments." IEEE Transactions on Audio, Speech, and Language Processing 22(11): 1973-1986.

Using a priori knowledge model has limited applicability in mobile communication devices because of its large computational load, proportional to the signal block dimension as disclosed by Kuropatwinski, M. and W. B. Kleijn in "Estimation of the Short-Term Predictor Parameters of Speech Under Noisy Conditions." IEEE Transactions on Audio, Speech, and Language Processing 14(5): 1645-1655, and by Deng, F., et al. (2015). "Sparse Hidden Markov Models for Speech Enhancement in Non-Stationary Noise Environments." IEEE Transactions on Audio, Speech, and Language Processing 22(11): 1973-1986. This large computational load precludes its use in devices having limited memory and computational resources. Additionally computational load contributes to increased energy consumption and leads to very fast exhaustion of the battery in any mobile device.

It is an object of the invention to overcome these limitation.

The invention concerns a method of enhancing distorted signal having a speech and noise component, with a processing device having memory with stored training information, comprising a step of distorted signal frame r acquisition, a step of computing orthogonal transform over the frame r to obtain distorted signal magnitude spectrum d and distorted signal phase spectrum, a step of removing noise in spectrum domain according to a noise and speech model, and a step of synthetizing speech signal with inverse transformation from spectrum domain to time domain. According to the invention the training information (T) comprises dictionaries of compact spectra prototypes of speech $(s_{i_1})$ and noise $(n_{i_2})$, speech gains $$(c_{S_{i_3}})$$

and noise gains $$(c_{N_{i_4}})$$

forming together composite states $i=(i_1, i_2, i_3, i_4)$. Training information also comprises probabilities of state history, so called transition probabilities. Dictionaries of compact spectra prototypes comprise compact spectra prototypes of a first dimension and of a second dimension where second dimension is higher or equal to the first dimension. The step of removing noise includes computation of a first compact spectrum $\bar{d}_1$ of the first dimension from magnitude spectrum d, computation of a second compact spectrum $\bar{d}_2$ of the second dimension from magnitude spectrum d, and subsequently preselection from training information a set of composite states matching the first compact spectrum $\bar{d}_1$. Such preselection executed on the compact spectra having small dimension is fast and reduces the number of states and hence computational effort in the following steps. The step of removing noise further includes step of evaluation of composite states likelihood and transition probabilities with a'priori knowledge model to assign probabilities to sequences of states, using the second compact spectra $\bar{d}_2$. Use the second compact spectrum with the larger second dimension allows more precise computation of probabilities and computing probabilities for discrete states enables factorization of computations. In further step a'posteriori probabilities of the preselected states are computed using forward and backward probabilities calculated on a base of the likelihoods of the preselected composite states and transition probabilities corresponding to at least three frames. A'posteriori probabilities together with training information are used to estimate a noise compact spectrum $\hat{d}_{2n}$ and a speech compact spectrum $\hat{d}_{2s}$. Finally magnitude of clear signal is recovered using speech magnitude spectrum, the estimated noise compact spectrum, the estimated speech compact spectrum and distorted signal magnitude spectrum d. Synthesizing clear speech is then just a matter of transforming phase spectrum and recovered speech magnitude spectrum to time domain with inverse or pseudo inverse transformation.

Advantageously the first dimension of the first compact spectrum is greater than 4 and lower than 10 and the second dimension of the second compact spectrum is greater than 7 but lower than 30. In case of system with typical frame lengths in audio systems, for values of the first dimension below 4 preselection is not precise enough while for values of the first dimension exceeding 10 the preselection requires a lot of computing operation and is very time and energy consuming. Values of the second dimension exceeding 7 enables precise calculation of probabilities. Second dimension above 30 costs a lot of computation but brings a little or no increase in quality.

Optimal selection of the first and second dimension may depend on the sampling frequency. For instance for 8 kHz optimal value of the first dimension is within a range $\{4, \ldots, 7\}$ and value of the second dimension is within a range of {8, ..., 15}. Greater values of the second dimension, up to 30, may be beneficial for wideband audio signals sampled with frequency of 16 kHz.

Advantageously at least one of the estimation of the noise compact spectrum and estimation of the speech compact spectrum involves calculation of the expected value over the preselected composite states using a'posteriori probabilities. This approach instead of mere selection of the most probable state enables more precise modeling and lower distortions of the resulting clear speech signals.

Advantageously the training information (T) comprises noise covariance matrix ($C_N$) and speech covariance matrix ($C_S$) and the step of evaluation of composite states likelihood includes evaluations of log-likelihood of preselected states according to formula:

$$\log[p(\overline{d_2}|[i_j])] = -\frac{P}{2}\log(2\pi) - \frac{1}{2}\log[\det(c_{s_{i_3}}^2 C_S + c_{n_{i_4}}^2 C_N)] + -\frac{1}{2}(\overline{d_2} - c_{s_{i_3}}\overline{s2}_{i_1} - c_{n_{i_4}}\overline{n2}_{i_2})^T$$
$$(c_{s_{i_3}}^2 C_S + c_{n_{i_4}}^2 C_N)^{-1}(\overline{d_2} - c_{s_{i_3}}\overline{s2}_{i_1} - c_{n_{i_4}}\overline{n2}_{i_2})$$

Advantageously log-likelihood of preselected states are executed with approximation:

$$\log[p(\overline{d_2}|[i_j])] = -\frac{P_2}{2}\log(2\pi) - \frac{P_2}{2}\log(v_{i_3,i_4}) - \frac{1}{2v_{i_3,i_4}}(\|\overline{d_2}\|_2^2 + c_{s_{i_3}}^2\|\overline{s2}_{i_1}\|_2^2 + c_{n_{i_4}}^2\|\overline{n2}_{i_2}\|_2^2 + 2c_{s_{i_3}}c_{n_{i_4}}\langle\overline{s2}_{i_1},\overline{n2}_{i_2}\rangle - 2c_{s_{i_3}}\langle\overline{s2}_{i_1},\overline{d_2}\rangle - 2c_{n_{i_4}}\langle\overline{n2}_{i_1},\overline{d_2}\rangle)$$

where $v_{i_3,i_4}$ represents maximal eigenvalue of matrix $$c_{s_{i_3}}^2 C_S + c_{n_{i_4}}^2 C_N.$$

Advantageously for evaluation of log-likelihood of different preselected states i following terms are calculated once and stored in cache memory:

$$\|\overline{d}\|_2^2, c_{s_{i_3}}^2\|\overline{s2}_{i_1}\|_2^2, c_{n_{i_4}}^2\|\overline{n2}_{i_2}\|_2^2, 2c_{s_{i_3}}c_{n_{i_4}}\langle\overline{s2}_{i_1},\overline{n2}_{i_2}\rangle, \langle\overline{s2}_{i_1},\overline{d_2}\rangle, \langle\overline{n2}_{i_2},\overline{d_2}\rangle.$$

More specifically the memory contains the sum of the above terms excluding the terms which involve the noisy speech second dimension compact spectrum.

Thanks to that operation the computational complexity is proportional to the sum of speech and noise compact spectra dictionaries cardinalities, not their product.

Advantageously the training information (T) includes smoothing coefficients and computing transitional probabilities in the step is executed with a use of smoothing coefficients ($\lambda_S^{(l)}, \lambda_N^{(l)}$). Smoothing coefficients allow calculation of the transitions probabilities taking into account in computations simultaneously probabilities of histories of states having different length.

The invention also concerns a mobile communication device having a battery and processing device with connected memory, radio transceiver and audio input, characterized in that it is adapted to receive audio signal from audio input and execute the method according to the invention on this signal and then transmit it with radio transceiver.

Advantageously the training information is stored in the memory.

Advantageously the mobile communication device has a separate memory for storing sum of the terms computed off-line:

$$c_{s_{i_3}}^2\|\overline{s2}_{i_1}\|_2^2 + c_{N_{i_4}}^2\|\overline{n2}_{i_2}\|_2^2 + 2c_{s_{i_3}}c_{n_{i_4}}\langle\overline{s2}_{i_1},\overline{n2}_{i_2}\rangle.$$

Using small memory with fast access can speed up the calculations. Moreover a memory of size of few hundreds of bytes is used to store the terms computed for each frame that is terms involving the second dimension compact spectrum:

$$\|\overline{d}\|_2^2, \langle\overline{s2}_{i_1},\overline{d_2}\rangle, \langle\overline{n2}_{i_2},\overline{d_2}\rangle.$$

Advantageously the mobile communication device is adapted to compute training information (T).

Invention concerns also a computer program product for a use with mobile communication device having a processing device and memory. Computer program product according to the invention comprises a set instructions that after loading to memory cause processing device execute the method according to the invention.

The computer program product advantageously comprises training information (T) including: dictionaries of compact spectra prototypes of speech ($s_{i_1}$) and noise ($n_{i_2}$), speech gains $$(c_{s_{i_3}})$$

and noise gains $$(c_{N_{i_4}})$$

forming together composite states i=($i_1, i_2, i_3, i_4$), probabilities of state history.

Advantageously the training information (T) comprises noise covariance matrix ($C_N$) and speech covariance matrix ($C_S$).

Advantageously the training information comprises smoothing coefficients.

Figure 2A:
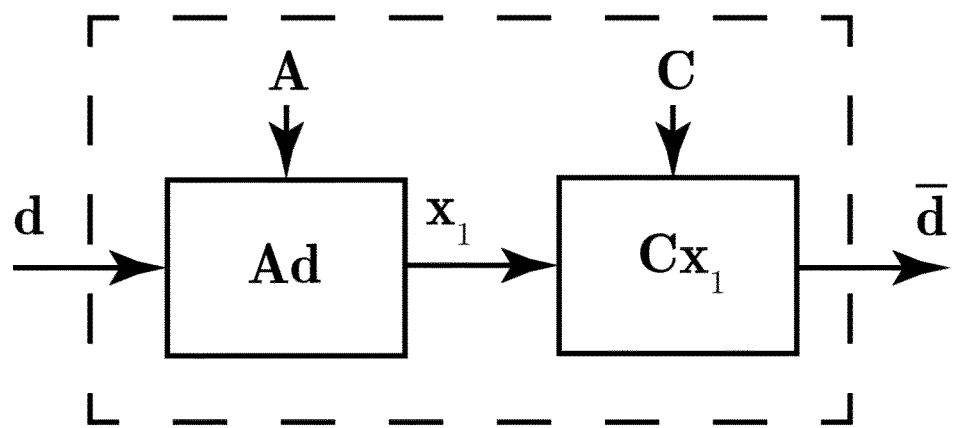
Figure 2B:
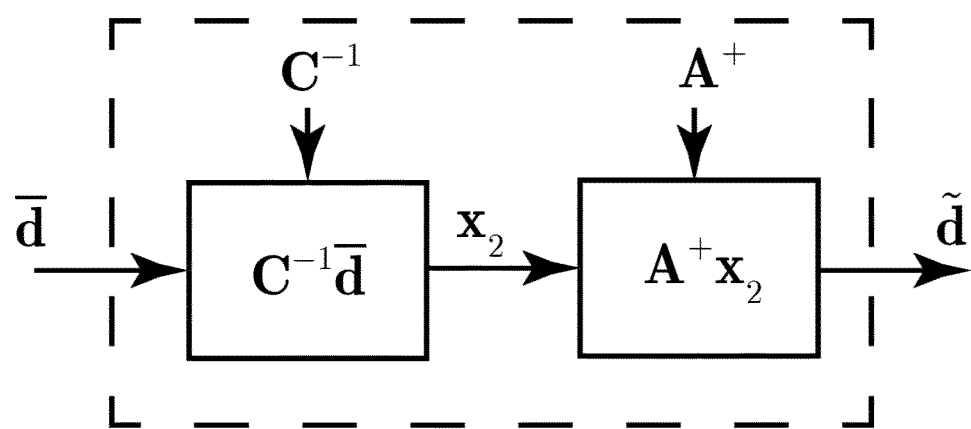
Figure 2C:
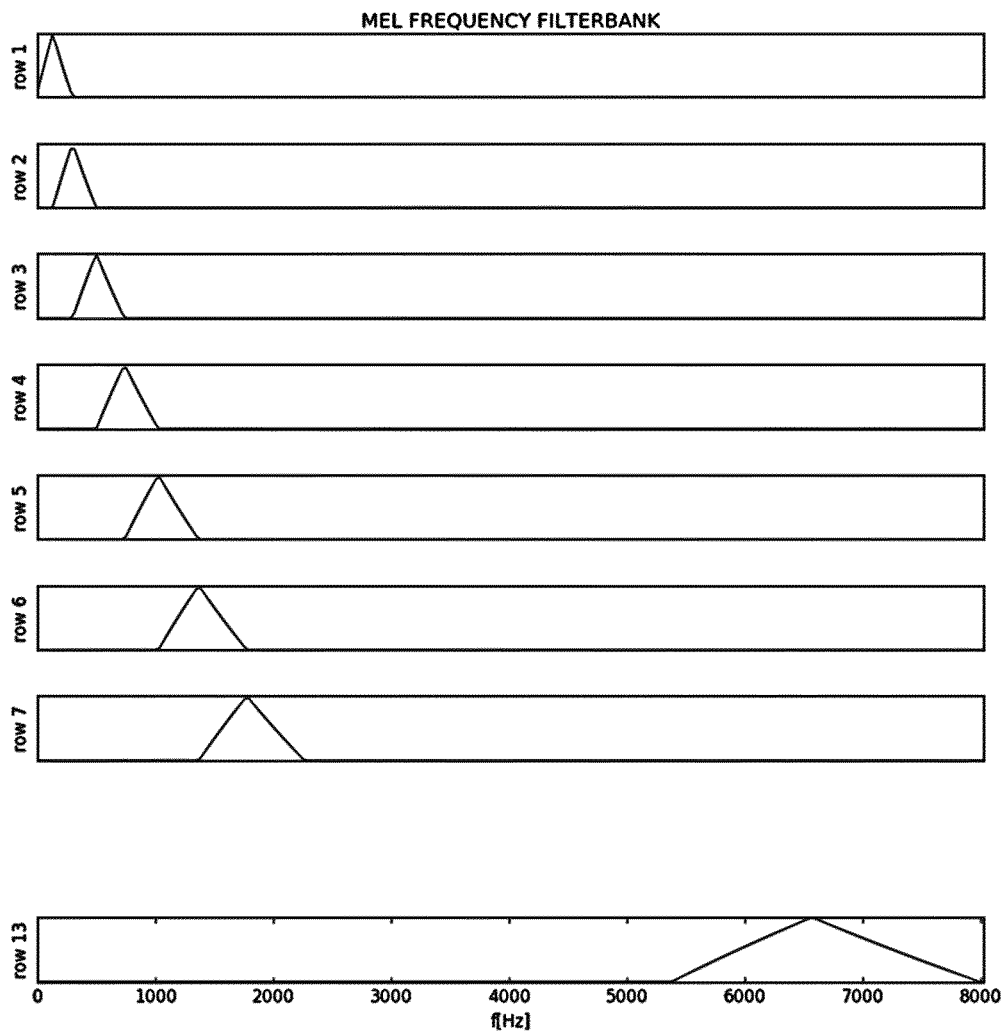
Figure 3:
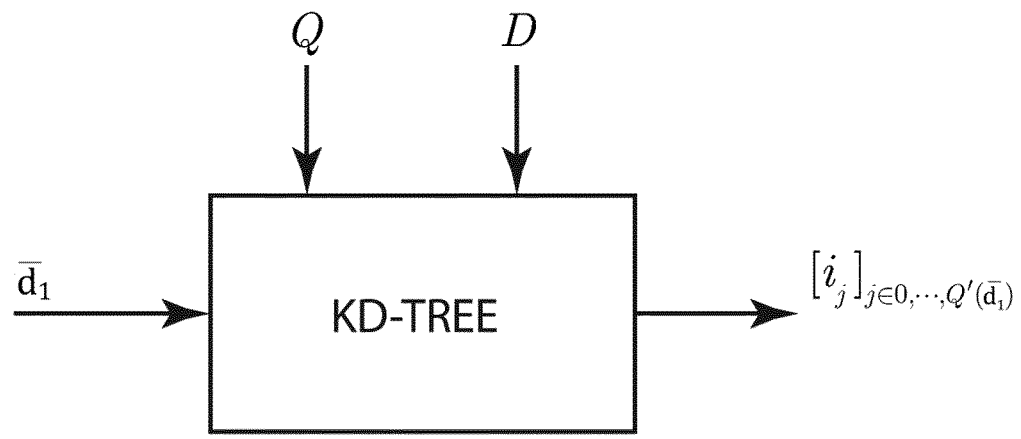
Figure 4:
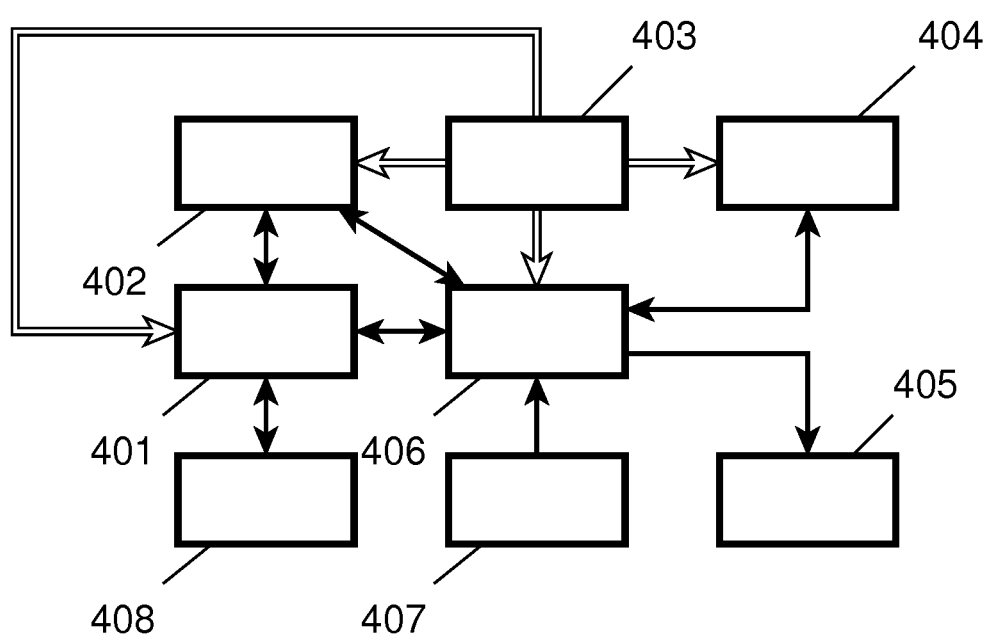

The invention is described below with reference to attached figures. FIG. 1 presents a flow chart of the method according to the invention, FIG. 2a, FIG. 2b, presents a flow chart of the method of computation compact spectra and inverse transformation respectively, FIG. 2c presents sample filterbank used for compact spectra computation, FIG. 3 presents a preselection block and FIG. 4 presents a block diagram of the mobile communication device according to the invention.

Flowchart of an sample embodiment of the method according to the present invention is presented in FIG. 1. It is assumed that prior to application of the method according to the invention a training step is executed for providing training information T. This training information T is stored in a memory of a device with which method according to the invention is executed. It can be downloaded, loaded together with computer program product according to the invention or even computed by the very same device.

In a method according to the invention distorted speech signal having a clear signal component and noise component is acquired in step 101 from a microphone or by receiving its digital representation from other device and subjected to preemphasis filtering. Then it is splited into frames of N samples in step 102. In an exemplary embodiment frame length N–256 was selected for a speech signal sampled with frequency of 8 kHz. Frames were spaced by 200 samples. Typical alternative sampling frequency is 16 kHz.

Over a frame r of distorted speech signal an orthogonal transformation is computed in step 103. For the sake of efficiency and easiness of implementation Fast Fourier Transform (FFT) is a reasonable choice. FFT over r results in a frequency domain representation of frame r. From this representation magnitude spectrum d is calculated in step 104 and phase spectrum in step 105.

Magnitude spectrum is represented as $$M = \frac{N}{2} + 1$$

non-repeating samples, therefore the length of d is equal to M. A vector d of length M of magnitude spectrum is used to compute compact spectra. Using compact spectra enables significant decrease of the dimensionality of the preselection step 109 executed later. Further enhancement is obtained by calculating two compact spectra: in step 107 a first compact spectrum $\bar{d}_1$ of lower dimension $P_1$ and in step 108 a second compact spectrum $\bar{d}_2$ of higher dimension $P_2$. Such bifurcation makes it possible to execute time and resource consuming steps of the method faster using the first compact spectrum having lower dimension and execute the steps that are more susceptible to dimension using the second compact spectra having higher dimension.

To compute a compact spectrum of given dimension P subsequent filtering with P filters and contraction matrix C is applied as shown FIG. 2*a*. Filtration is applied by matrix multiplication of the magnitude spectrum d by a filtering matrix A having dimension P×M and then applying multiplication by matrix C having size P×P.

Matrix A is a filter bank of a choice. For example it may be a mel frequency filter bank as shown in FIG. 2*c* or a gammatone filterbank.

$$A = \begin{bmatrix} a_0 \\ a_1 \\ \ldots \\ a_{P-1} \end{bmatrix} \in \mathbb{R}^{P \times M}$$

where $a_i \in \mathbb{R}^{1 \times M}$.

Contraction matrix C is selected so that $(A^+)^T \times (A^+) = C^T C$, where $A^+$ stands for the pseudoinverse of A.

$$A^+ = VE^+U^T \in \mathbb{R}^{M \times P},$$

whereas: $A = UEV^T$, is the Singular Value Decomposition, and $E^+$ is obtained by replacing non-zero elements of the table E with their inverses.

The contraction matrix is computed using the Cholesky decomposition of matrix $(A^+)^T \times (A^+)$ preceded by the projection of this matrix onto the space of positive definite tables.

Compact spectra are calculated according to the formula:
$$\bar{d} = CAd \in \mathbb{R}^{P \times 1}.$$

Inverse compact spectra operation, as shown in FIG. 2*b* is calculated according to the formula:
$$\tilde{d} A^+ C^{-1} \bar{d}.$$

The operation of computing compact spectrum is a lossy one, so reverse operation shown in FIG. 2*b* is in fact pseudoinverse.

The selection of values of the first $\bar{d}_1$ and the second $\bar{d}_2$ compact spectra dimensions, $P_1$ and $P_2$ respectively, depends on the available resources of the hardware on which the method is run. For a $P_1$ equal to 8 and $P_2$ equal to 15 gave reasonable results. Assuming that noise removal is executed on Xilinx Artix-7 XC7A35T-L1CSG324I FPGA the energy consumption thanks to the invention is at least 10 times lower comparing to the state of the art methods with the same output speech quality. Other experiments shown that significant improvements with respect to the states of the art methods are observed for $P_1 \in (1,8)$ in some application particularly good for $P_1 \in (4,7)$ and $P_2 \in (2,30)$, for most applications range $P_2$ greater than 7 would be required. First compact spectra of dimension lower than 4 for typical frame length would definitely carry not enough information for the next method steps to be successfully executed while dimension higher than 8 would contribute very highly (exponentially) to the complexity of the preselection step 109. Only very significant improvement of the state of the art devices would make the first dimension over 8 useful. The dimension of the second spectrum should be not lower than 8 for frames of typical length for audio systems i.e. 20-30 ms. It can be as low as 2 for frame of shorter time duration down to 2 sample at 16 kHz sampling rate. Short frames are less convenient and are applied only in very particular applications, in particular in hearing aids.

Let as define a composite states as a tensor of order 2 having one dimension corresponding to the time (precisely frame numbers) and the second to a structure comprising fields $i_1$—indication of the speech compact spectra prototype,
$i_2$—indication of the noise compact spectra prototype,
$i_3$—speech gain and
$i_4$—noise gain.

Conception of composite state originate from the a'priori knowledge model. It is assumed that for given frame r compact spectrum $\bar{d}$ is approximated by a composite state with static gains $c_{s_{i_3}}$ and $$c_{n_{i_4}}.$$

The same gains applies to the compact spectrum $\bar{d}_1$ of the first dimension $P_1$ and to the compact spectrum $\bar{d}_2$ of the second dimension $P_2$:

$$\bar{d}_1 = c_{s_{i_3}} \cdot \bar{s}_{1_{i_1}} + c_{n_{i_4}} \cdot \bar{n}_{1_{i_2}},$$

$$\bar{d}_2 = c_{s_{i_3}} \cdot \bar{s}_{2_{i_1}} + c_{n_{i_4}} \cdot \bar{n}_{2_{i_2}}.$$

$$\bar{s}_{1_{i_1}}, \bar{n}_{1_{i_2}}$$

stand for prototypes of compact spectra of the first dimension of the speech and noise respectively and $$\bar{s}_{2_{i_1}}, \bar{n}_{2_{i_2}}$$

stand for prototypes of compact spectra of the first dimension of the speech and noise respectively.

Every compact spectra prototype of the first dimension has a corresponding prototype of second dimension. Hence a state indicators $i_1, i_2, i_3, i_4$, apply to both prototypes of the first dimension and of the second dimension.

Consequently, it is possible to provide training information T obtained in training step 100 preceding execution of the method according to the invention prototypes of compact spectra of the first and the second dimension corresponding to each other. Accordingly, training step 100 is assumed to have provided following information:

$\{s_{i1}\}_{i \in (N_s)}$, $s_i \in \mathbb{R}^P$—dictionary of speech compact spectra prototypes of the first dimension and of the second dimension, $\{n_{i2}\}_{i \in (N_n)}$, $n_i \in \mathbb{R}^P$—dictionary of noise compact spectra prototypes of the first dimension and of the second dimension, $\{c_{s_{i3}}\}_{i \in (N_{cs})}$, $c_{s_{i3}} \in \mathbb{R}_+$—dictionary of speech gains, $\{c_{s_{i4}}\}_{i \in \mathbb{R}_+}$—dictionary of noise gains.

The training step 100 further provides additional information used in further step of likelihood evaluation:

$C_s \in \mathbb{R}^{P \times P}$—speech covariance matrix, $C_N \in \mathbb{R}^{P \times P}$—noise covariance matrix, $\{P_S^{(l)}\}_{l \in (L)}$—probabilities of the speech state history of length l, where L−1 is the longest history considered, $\{\lambda_S^{(l)}\}_{l \in (L)}$—smoothing coefficients for probabilities of speech state history of length l, $\{P_N^{(l)}\}_{l \in (L)}$—probabilities of the noise state history of length l, where L−1 is the longest history considered, $\{\lambda_N^{(L)}\}_{l \in (L)}$—smoothing coefficients for probabilities of noise state history of length l, altogether referred to as training information T.

Above, the symbol (N) is used to define range $\{0, \ldots, N-1\}$.

State history according to the invention refers to a high order state history wherein the length of the conditioning state history being at least two in terms of frames. The use of higher than 2, up to 20, state histories allows for more accurate estimation of the speech signal frame energies. Adding smoothing allows for a proper back-off in case the observations violate strongly the energy contours typical for the training set.

Composite states and probabilities of state history are contained in the training information T. Number of available states depends on the cardinality of the dictionaries. The time required for selection the best state depends exponentially on the number of prototypes and hence for exhaustive search is very large. Preselection 109 consists in selecting from the whole set of available most promising composite states that is a subset of composite states the math given first compact spectra $\bar{d}_1$. The complexity of preselection depends on the value of $P_1$ of the dimension of the first compact spectrum $\bar{d}_1$ and it is a growing dependence.

Let us denote cardinality of speech compact spectra dictionary as $N_S$, cardinality of noise compact spectra dictionary as $N_N$, cardinality of speech gains dictionary $N_{C_s}$ and cardinality of noise gains dictionary as $N_{C_n}$. When the first compact spectra $\bar{d}_1$ dimension $P_1$ is selected in a range from 4 to 7 then it is possible to preselect a subset of most promising composite states using a KD-tree algorithm employing the histogram and dynamic pruning in real time. In traditional systems this measure is not possible due to high dimension of the raw magnitude spectrum. For modern hardware P1=10 is a boundary value enable KD-tree preselection. Above the dimension of eight the "curse of dimensionality" causes the KD-tree losing the fast search property. For the low dimension of the first compact spectrum the KD-tree has logarithmic complexity in the number of searched points. Thus the exhaustive search proportional to the product of $N_S \cdot N_N \cdot I_{C_s} \cdot I_{C_n}$ corresponding to total number of speech prototypes, total number of noise prototypes, total number of speech gains and total number of noise gains respectively is reduced to being proportional to $\log_2(N_S \cdot N_N \cdot I_{C_s} \cdot I_{C_n})$ computations. Thus it is possible to use the static, quantized gains instead of the adaptive gains used in the state-of-the-art systems and still operate in real time, which is a significant improvement over the state of the art models in which gains are determined in dividing the whole speech frames by superposition of noise and signals prototypes known from Loizou, Philipos C. Speech enhancement: theory and practice. CRC press, 2013. p. 190.

Preselection applied in step 109 is based on the algorithm disclosed by Friedman, Jerome H., Jon Louis Bentley, and Raphael Ari Finkel "An algorithm for finding best matches in logarithmic expected time" ACM Transactions on Mathematical Software (TOMS) 3.3 (1977): 209-226. It receives the first compact spectrum $\bar{d}_1$ a histogram trimming coefficient Q and dynamic limitation coefficient D, as shown in FIG. 3.

The Q parameter fed to KD-tree block shown in FIG. 3, corresponds to the so called histogram pruning coefficient known in the dynamic programming terminology. It describes the condition on the longest acceptable length of the state's list at the output of the preselection step. The D parameter in turn corresponds to the so called dynamic pruning coefficient known in the dynamic programming terminology. For example, if we accept states with likelihood at most Zx less probable than the best states, the D coefficient can be found using following program Solve[(1−Erf[D/Sqrt[2]])==1/Z, D].

In the KD-tree the operation in the leaf nodes during search is modified. In the state-of-the-art implementation of the KD-tree we usually have to do with either m-best search or range search. M-best search finds m candidates, which are closest to the query. The range search in turn return all candidates within the radius of the query point. In our system we combine the Q-best search—as described in above paragraph regarding definition of Q—and a modified range search. The range search is modified in that the range is updated after traversing each leaf node to be the distance of the query from the current best candidate multiplied by the D coefficient—as described in above paragraph regarding definition of D.

In Preselection step 109 for given first compact spectrum $\bar{d}_1$ a minimum number of $Q^{t(\bar{d}_1)}$ of preselected states is returned. Those states simultaneously comply to the first condition and second condition. Denoting j-th composite state $i_j = [i_1^{(j)}, i_2^{(j)}, i_3^{(j)}, i_4^{(j)}]$ of $(N_S) \times (N_N) \times (N_{C_s}) \times (N_{C_N})$ states we can formulate the set of first and second conditions as follows:

$$\begin{cases} \left\| \overline{d}_1 - C_{S_{i_3^{(0)}}} \cdot s_{i_1^{(0)}} - C_{N_{i_3^{(0)}}} \cdot n_{i_3^{(0)}} \right\| \times D \geq \\ \left\| \overline{d}_1 - C_{S_{i_3^{(Q'(\overline{d}_1))}}} \cdot s_{i_1^{(Q'(\overline{d}_1))}} - C_{N_{i_3^{(Q'(\overline{d}_1))}}} \cdot n_{i_3^{(Q'(\overline{d}_1))}} \right\| \\ Q'^{(\overline{d}_1)} \leq Q - 1 \end{cases}$$

where composite states are sorted according to the increasing distance from the query point: noisy speech compact spectrum $\overline{d}_1$.

A set of preselected in step 109 states $[i_j]_{j \in 0, \ldots, Q'(\overline{d}_1)}$ is processed in step 110 of state transition probabilities and likelihood evaluation. Likelihood is a probability of observation of a particular composite state. Likelihoods are in the state of the art also often referred to as "emission probabilities".

Unfortunately the value of $P_1$ equal between 1 and 10 is not high enough to enable precise evaluation of the likelihood for frames of typical duration e.g. ~20 ms. Precise evaluation of likelihood is required to calculate a'posteriori probabilities and finally a compact spectra prototypes of speech and noise required to extract clear speech. Therefore, composite states preselected in step 109 are in step 110 used with compact spectra prototypes of second dimension $P_2$.

Let as consider a vector of states $[i_t]$ corresponding to subsequent L frames $\{t-L+1, t-L+1, \ldots, t\}$ it is further referred to as composite state history. Composite states belong to the set of $K = N_S \cdot N_N \cdot N_{C_S} \cdot N_{C_N}$ of possible distinct states available in dictionaries being a part of training information T. State transition probability is a conditional probability of the current state history conditioned by the previous state history: $p([i_t]|[i_{t-1}])$. Likelihood is a conditional probability of given compact spectra $\overline{d}_2$ of second dimension $P_2$ for the current frame r, conditioned on the composite state i, formally: $p(\overline{d}_2|[i_j])$. Path is defined as T consecutive speech, noise or composite states corresponding to T consecutive frames. Path probability is a product of all state transitions and likelihoods on the path. To avoid numerical underflows or overflows and for the sake of convenience and effectiveness the product is implemented in logarithmic scale so that it could be replaced with mere addition. Logarithm of the likelihood is referred to as log-likelihood. A history of states with corresponding path probability is considered a hypothesis. Therefore calculation of log-likelihood may be considered a processing of hypothesis list. This list is advantageously expanded under following conditions. To facilitate precise definition of these conditions as well as of the following algorithm steps some notation is introduced:

$$i_t^{(l)} = [i_r]_{r \in \{t-l+1, \ldots, t\}}$$

where l denotes the length of the observed state history.

The mentioned condition is:

$$p\left(i_{1t} | i_{1t}^{(h)}\right) = \begin{cases} p(i_{1t}) & \text{if } i_{3t} \neq i_{3t-1} \\ p\left(i_{1t} | i_{1t}^{(h)}\right) & \text{otherwise} \end{cases}$$

$$p\left(i_{2t} | i_{2t}^{(h)}\right) = \begin{cases} p(i_{2t}) & \text{if } i_{4t} \neq i_{4t-1} \\ p\left(i_{2t} | i_{2t}^{(h)}\right) & \text{otherwise} \end{cases}$$

where h is the maximal number of past states taken into consideration.

The computation of transition probabilities $p([i_t]|[i_{t-1}])$ is executed in recursive fashion. Speech states and noise states are treated separately. In this respect speech state is represented by a pair $i_S = (i_1, i_3)$ and noise state is represented by a pair $i_N = (i_2, i_4)$. Accordingly:

$$p(i_{S_t}^{(1)}|i_{S_t}^{(0)}) = P^{(0)}(i_{S_t}^{(1)}),$$

$$p(i_{S_t}^{(1)}|i_{S_{t-1}}^{(l)}) = P^{(l)}(i_{S_t}^{(l+1)}) + \lambda_S^{(l)}(i_{S_{t-1}}^{(l)}) p(i_{S_t}^{(1)}|i_{S_{t-1}}^{(l-1)}),$$

and $$p(i_{N_t}^{(1)}|i_{N_t}^{(0)}) = P^{(0)}(i_{N_t}^{(1)}),$$

$$p(i_{N_t}^{(1)}|i_{N_{t-1}}^{(l)}) = P^{(l)}(i_{N_t}^{(l+1)}) + \lambda_N^{(l)}(i_{N_{t-1}}^{(l)}) p(i_{N_t}^{(1)}|i_{N_{t-1}}^{(l-1)}),$$

The speech and noise transition probabilities are computed according to the above formula and then multiplied together:

$$p(i_t^{(1)}|i_{t-1}^{(l)}) = p(i_{S_t}^{(1)}|i_{S_{t-1}}^{(l)}) \cdot p(i_{N_t}^{(1)}|i_{N_{t-1}}^{(l)})$$

In the description signal type label "S", "N" are often omitted for the sake of simplicity.

Smoothing coefficients $\lambda^{(1)}$ allow using probabilities of state histories of different length available in training information T. It is possible to implement the method according to the invention without them but precision of probability evaluation would be lower.

The log-likelihood of noisy signal compact spectrum is computed as a convolution of likelihood of speech and noise compact spectra. Each speech or noise likelihood is a multivariate Gaussian distribution, which depends on Gaussian parameters:

mean vector times gain coefficient, $$c_{s_{i_3}} s_{i_1}$$

for speech and $$c_{n_{i_4}} n_{i_2}$$

for noise;
covariance matrix times square of gain coefficient—

$$c_{s_{i_3}}^2$$

$C_S$ for speech and $$c_{n_{i_4}}^2 C_N$$

for the noise.

The formula for the noisy compact spectrum likelihood is:

$$\log[p(\overline{d}_2 | [i_j])] =$$

$$-\frac{P}{2}\log(2\pi) - \frac{1}{2}\log[\det(c_{s_{i_3}}^2 C_S + c_{n_{i_4}}^2 C_N)] + -\frac{1}{2}(\overline{d}_2 - c_{s_{i_3}} \overline{s}_{2i_1} - c_{n_{i_4}} \overline{n}_{2i_2})^T$$

-continued
$$(c_s^2 C_S + c_{n_{i_4}}^2 C_N)^{-1}(\overline{d_2} - c_{s_{i_3}}\overline{s}_{2i_1} - c_{n_{i_4}}\overline{n}_{2i_2})$$

which is further approximated by $$\log[p(\overline{d_2} \mid [i_j])] = -\frac{P}{2}\log(2\pi) - \frac{P}{2}\log(v_{i_3,i_4}) +$$
$$-\frac{1}{2v_{i_3,i_4}}(\overline{d_2} - c_{s_{i_3}}\overline{s}_{2i_1} - c_{n_{i_4}}\overline{n}_{2i_2})^T(\overline{d_2} - c_{s_{i_3}}\overline{s}_{2i_1} - c_{n_{i_4}}\overline{n}_{2i_2})$$

where $v_{i_3,i_4}$ is defined as the maximal eigenvalue of the matrix:

$$c_{s_{i_3}}^2 C_S + c_{n_{i_4}}^2 C_N.$$

As the term $$(\overline{d_2} - c_{s_{i_3}}\overline{s}_{2i_1} - c_{n_{i_4}}\overline{n}_{2i_2})^T(\overline{d_2} - c_{s_{i_3}}\overline{s}_{2i_1} - c_{n_{i_4}}\overline{n}_{2i_2})$$

can be expanded to:

$$(\overline{d_2} - c_{s_{i_3}}\overline{s}_{2i_1} - c_{n_{i_4}}\overline{n}_{2i_2})^T(\overline{d_2} - c_{s_{i_3}}\overline{s}_{2i_1} - c_{n_{i_4}}\overline{n}_{2i_2}) =$$
$$+\|\overline{d_2}\|_2^2 + c_{s_{i_3}}^2\|\overline{s}_{2i_1}\|_2^2 + c_{n_{i_4}}^2\|\overline{n}_{2i_2}\|_2^2 + +2c_{s_{i_3}}c_{n_{i_4}}\langle\overline{s}_{2i_1},\overline{n}_{2i_2}\rangle -$$
$$2c_{s_{i_3}}\langle\overline{s}_{2i_1},\overline{d_2}\rangle - 2c_{n_{i_4}}\langle\overline{n}_{2i_2},\overline{d_2}\rangle$$

where $\langle x, y \rangle$ operation represents a dot product, also known as the scalar product.

That contrasts with the state of the art approach of computing the likelihood (cf. Kuropatwinski, M. and W. B. Kleijn in "Estimation of the Short-Term Predictor Parameters of Speech Under Noisy Conditions." IEEE Transactions on Audio, Speech, and Language Processing 14 (5): 1645-1655, eq. 7) in which likelihood computation requires implementing division operation of the frame spectra. The improvement is very significant as according to the present invention number of operations is reduced and so is the size of the vectors as dimension $P_2$ is lower than frame length. Moreover, it can be immediately seen that the dot products can be cached and thus the total cost of computing the distances for all states is bounded by the sum of numbers of speech and noise compact spectra prototypes. Storing in static memory the sum of the below terms:

every product of the compact spectra prototype $$\langle\overline{s}_{2i_1},\overline{n}_{2i_2}\rangle,$$

every square norm of the compact spectra prototype $$\|\overline{s}_{2i_1}\|_2^2,$$

every square norm of the compact spectra prototype $$\|\overline{n}_{2i_2}\|_2^2,$$

is memory consuming, but allows saving a lot of energy on multiplication operations. Moreover, the dot products $$\langle\overline{s}_{2i_1},\overline{d_2}\rangle$$

$$\langle\overline{n}_{2i_2},\overline{d_2}\rangle$$

and the norm $\|\overline{d_2}\|_2^2$ are calculated only once per frame and then stored in the cache too. Application of the preselection step to the available composite states allows use a very small and very fast memory for this operation as the number dot products for the preselected states is significantly lower than it would be for the whole set of available states.

Then in step 111 a forward-backward algorithm known form Jurafsky, D. and J. H. Martin (2014) "Speech and language processing" pp. 181-190 is used to calculate a'posteriori probabilities. It involves a delay by $L_A$ frames. Value of look ahead $L_A$ is selected so that the delay related to buffering a number of frames was unobserved in human communication but provides important information about subsequent states that enable more precise estimation of the state probability. When look ahead is equal to 1 computations are based on three frames: current, all previous and next giving the information required to obtain transition probabilities.

The forward probabilities are defined by the formula:

$$\alpha([i_{j,i}]) = p(\overline{d}_{2t=1}, \ldots, \overline{d}_{2t=i}[i_{j,i}]|T),$$

where $\hat{t}=T-L_A$, and T is the training information. The backward probabilities are in turn defined by the formula:

$$\beta([i_{j,i}]) = p(\overline{d}_{2t=i+1}, \ldots, \overline{d}_{2t=T}|[i_{j,i}],T).$$

It is important to note that forward and backward probabilities can be computed in recursive fashion, see equations 6.15-6.17 and 6.28-6.30 in Jurafsky, D. and J. H. Martin (2014) "Speech and language processing" pp. 181-190. Based on the just introduced forward-backward formulas the a'posteriori probability can be expressed as:

$$p([i_{j,i}] \mid \overline{d}_{2t=1}, \ldots, \overline{d}_{2t=i}, \ldots, \overline{d}_{2t=T}) = \frac{\alpha([i_{j,i}])\beta([i_{j,i}])}{\sum_j \alpha([i_{j,i}])\beta([i_{j,i}])}.$$

The a'posteriori probabilities are used in step 112 to estimate a compact spectrum of noise according to the formula:

$$\hat{d}_{2n} = \Sigma_j E[\overline{n}_2|\overline{d}_{2t=T-L_A}[i_{j,T-L_A}]]p([i_{j,T-L_A}]|\overline{d}_{2t=T},$$

and in 113 for speech:

$$\hat{d}_{2s} = \Sigma_j E[\overline{s}_2|\overline{d}_{2t=T-L_A}[i_{j,T-L_A}]]p([i_{j,T-L_A}]|\overline{d}_{2t=1}, \ldots, \overline{d}_{2t=T}).$$

where the expectation operation are defined by the following formulas:

$$E[\overline{s}_2 \mid \overline{d}_{2t=T-L_A}[i_{j,T-L_A}]] = (c_{s_{i_3}}^{-2}C_S^{-1} + c_{n_{i_4}}^{-2}C_N^{-1})^{-1}c_{n_{i_4}}^{-2}C_N^{-1}(\overline{d}_{2t=i} - c_{s_{i_3}}\overline{s}_{2i_1} - c_{n_{i_4}}\overline{n}_{2i_2}) + c_{s_{i_3}}\overline{s}_{2i_1},$$

$E[\bar{n}_2|$
$\bar{d}_{2t=T-L_4}[i_j,T-L_4]]=(c_{si_3}^{-2}C_S^{-1}+c_{ni_4}^{-2}C_N^{-1})^{-1}c_{si_3}^{-2}C_S^{-1}($
$\bar{d}_{2t=i}-c_{si_3}\bar{s}_{2i_1}-c_{ni_4}\bar{n}_{2i_2})+c_{ni_4}\bar{n}_{2i_2}.$ These speech compact spectrum of second dimension $\hat{d}_{2s}$ and noise compact spectrum of second dimension $\hat{d}_{2n}$ respectively are subjected to inverse compact spectrum operation in FIG. 2b in steps 114 and 115 respectively.

The estimation step 116 in FIG. 1. is performed according to the eq. 7.144 from Loizou, Philipos C. Speech enhancement: theory and practice. CRC press, 2013. The cited formula is following:

$$\hat{d}_{sk} = \frac{\sqrt{g_k}}{\sqrt{\pi}} \frac{\exp(g_k/2)}{I_0(g_k/2)} d_k,$$

where $\hat{d}_{sk}$ is estimated k-th line of the clean speech magnitude spectrum, $d_k$ is k-th line of the noisy speech magnitude spectrum, $I_0$ is the modified Bessel function of order zero and $g_k$ is defined in the cited reference on the page 245. The formula for $g_k$ involves the inverses of the compact spectra computed in steps 115 and 116 according to FIG. 2b.

In the synthesis step 117 the clean speech samples are computed according to the formula:

$$\hat{s}_p = \sum_{k=0}^{N-1} \hat{d}_{sk} \exp(j\theta_k)\exp\left(j\frac{2\pi}{N}pk\right),$$

where $j=\sqrt{-1}$ is the imaginary unit and $\theta_k$ is the k-th line of the noisy speech angular spectrum. The estimated speech samples $\hat{s}_p$ are subject to appropriate windowing before the overlap-add procedure. The final step of processing is the deemphasis operation with the filter with the transfer function given by:

$$H(z) = \frac{1}{1-0.95z^{-1}}.$$

Finally the clear samples are outputted in step 118. Speech signal after being enhanced is ready for transmission in conventional manner.

Method according to the present invention can be embodied in mobile communicating device in which it not only contributes to transmitting clearer speech but also to lower bandwidth and energy consumption. It is due to the fact that clear speech is easier to compress than noise-like interferences and hence the same compression methods give better compression rate when fed with clear speech obtained with a method according to the invention. That results in lower bandwidth requirement and lower energy consumption.

Exemplary block diagram of a mobile communication device according to the invention is shown in FIG. 4. The device has arithmetic unit 401 connected via bidirectional connection with memory 402 and I/O module 406. I/O module 406 is in direct bidirectional connection with memory 402 and transceiver 404 and is adapted to receive input audio signal from microphone 407 and to feed audio signal to the speaker 405. Arithmetic unit 401, I/O module 406, transceiver 404 and memory 402 are powered from battery 403 as indicated with double arrows. I/O module 406 and microphone 407 form together an audio input. Alternatively other audio inputs known in the art can be used including line-in from other systems.

Signal from the microphone 407 is delivered to the arithmetic unit via I/O module 406. Arithmetic unit executes a set of instruction stored within a memory 402 causing it to execute a method according to the invention. Then clear speech signal is processed with state of the art communicating techniques, including compression and delivered via I/O module 406 to the transceiver 404 for transmission. Audio signal received from the transceiver 404 is delivered to speaker via I/O module 406.

Optionally signal received from the transceiver 404 can be also subjected to the method according to the invention and enhanced by clearing of noise. Nevertheless, clearing from noise is advantageously done on the transmitting side as clear speech signal is better conditioned for compression. Therefore, if the signal is cleared prior to transmission it requires less bandwidth for the same quality or can have better quality within the same bandwidth. Energy consumption required for compression of the clear signal is also lowered.

Optionally additional small and very fast static memory 408 is used for the storage of the products $$\|\bar{d}\|_2^2, \langle \bar{s}_{2i_1}, \bar{d}_2 \rangle, \langle \bar{n}_{2i_1}, \bar{d}_2 \rangle.$$

If compact spectra dot products are represented by 8 bits, and the number of speech and noise states are 512 and 256 respectively, the amount of memory required for caching per frame is less than 1 kB. If the size of memory of just a few or few tens of kB the access can be extremal fast. Caching in ultra small and ultra fast memory is possible thanks to combining the execution of the likelihood evaluation step (110) on the compact spectra of dimension $P_2$ lower than the frame size with preselection operation that limits number of states for which above products need to be stored.

Memory 402 includes training information T it may be delivered together with computer program product comprising the instruction set causing arithmetic unit to execute method according to the invention, downloaded from the external server or even the mobile communication device can be adapted to process training sequences and calculate training information.

Experiments performed by the inventor show that the invention allows very significant reduction—at least 10 up to 1000 times—of energy consumption comparing to the state of the art methods and devices, with the same enhanced speech quality as determined using various quality measures such as PESQ, SNR, SEGSNR, and measurements according to the ITU P.835 standard.

The training operation is one-time effort, nevertheless resulting training information is required to run the method according the invention and is needed in the memory of the device according to the invention and needs to be a part or complementary element of the computer program product according to the invention.

The invention may be implemented in a computer program for running on a computer system such as mobile device. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be distributed on a data carrier, such as optical disc, a hard disk, or flash memory, stored with data loadable in a memory of a computer system, the data representing the computer program. The data carrier may thus be a tangible data carrier. The data carrier may be a data connection, such as a telephone cable a network cable or a wireless connection.

Training is performed separately for the speech and noise signal based on training sets. For example it is possible to use 30 min database of speech and similarly for noise. The noise database contains typical noises coming from several environments covering the large part of possible use cases.

The databases were processed by preemphasis filter before use. The preemphasis filter has transfer function given by the formula:

$$H(z)=1-0.95z^{-1}.$$

After preemphasis all speech and noise chunks where power normalized. The power normalization has been based on the ITU P.56 active speech level algorithm. Each chunk has been amplitude scaled to be of equal active level.

Thereafter the Baum-Welch reestimation has been performed according to the following algorithm. For the sake of simplicity we assume the training sequence is continuous and consist of U frames: $TS=\{v_t\}_{t\in(U)}$. The Baum-Welch algorithm has been initialized using K-Means algorithm for spectral prototypes and histogram estimation of transition probabilities.

The Baum-Welch algorithm runs in two steps:
Step I: Computation of a'posteriori probabilities $$p(s_t, s_{t-1}|TS, T^{(k)}),$$

where:

$$s_t = [i_t]_{t \in \{i-L+1, \ldots, i\}}$$

TS is the training set of utterances and $T^{(k)}$ is the training information at k-th iteration of the Baum-Welch algorithm.
Step II: Computation of transition probabilities:

$$p(s_t = m | s_{t-1} = n) = \frac{\sum_t p(s_t = m, s_{t-1} = n | TS, T^{(k)})}{\sum_{m}\sum_t p(s_t = m, s_{t-1} = n | TS, T^{(k)})},$$

and emission probabilities parameters:
means (prototypes) and covariances respectively:

$$m(i_t = m) = \frac{\sum_t v_t p(i_t = m | TS, T^{(k)})}{\sum_t p(i_t = m | TS, T^{(k)})}$$

$$C = \frac{\sum_t \sum_n (v_t - m(i_t = n))(v_t - m(i_t = n))^T p(i_t = n | TS, T^{(k)})}{\sum_t \sum_n p(i_t = n | TS, T^{(k)})}.$$

Step I and step II are iterated until convergence.

For computation of the back-off model (consisting of parameter sets $\{P_S^{(l)}\}_{l\in(L)}$, $\{\lambda_S^{(l)}\}_{l\in(L)}$, $\{P_N^{(l)}\}_{l\in(L)}$, $\{\lambda_N^{(l)}\}_{l\in(L)}$) of transition probabilities the final, after Baum-Welch algorithm, $p(s_t=m, s_{t-1}=n|TS, \theta')$ are taken with appropriate discounting. Before discounting the former probabilities are multiplied by the total number of training frames to get counts instead of fractions. The back-off model is computed according to the formulas disclosed by Wikipedia contributors. In "Kneser-Ney smoothing." *Wikipedia, The Free Encyclopedia*. Wikipedia, The Free Encyclopedia, 25 Jun. 2017. Web. 26 Jul. 2017.

It should be stressed that once teaching of the present invention are disclosed to the person skilled in the art this person would be able to routinely adapt multiple state of the art training methods and sequences to obtain the training information T required to run a method according to the invention or to implement it in a device according to the invention as well as on the remote server with which device according to the invention communicates.

The method according to the invention can be implement in of the shelf mobile communication devices. Device according to the invention may therefore just run a computer program product according to the invention or have custom hardware adapted for even faster execution of the method according to the invention.

Those skilled in the art given the teachings of the above description are able to routinely propose multiple hardware and software solutions for device according to the invention and for computer implemented execution of the method according to the invention as well as methods of obtaining training information.

It is stressed that the above description is a mere illustration of the present invention and those skilled in the art will be able to propose many alternative embodiments covered by the scope of protection as defined in attached claims.

In the claims, any reference signs placed between parentheses shall not be construed as limiting the claim. Use of the verb "comprise" mean that there are no elements or steps other than those stated in a claim. The article "a" or "an" preceding an element does not exclude the presence of a plurality of such elements.

LIST OF SYMBOLS AND ANNOTATIONS
MOST FREQUENTLY USED $\|x\|_2$—2-norm of the vector x
$\langle x, y \rangle$—scalar product also known as dot-product of vectors x and y
$(N)=\{0, \ldots, N-1\}$—range definition
t—frame number
T—number of thus far observed frames
r—frame of the noisy signal
d—magnitude spectrum
$\bar{d}$—compact spectrum
$\bar{d}_{2t=*}$—compact spectrum of second dimension at frame number *
$\hat{d}_{2s}$—estimated compact spectrum of second dimension for speech
$\hat{d}_{2n}$—estimated compact spectrum of second dimension for noise
$\tilde{d}$—approximated magnitude spectrum
$\tilde{d}_s$—approximate speech magnitude spectrum
$\tilde{d}_n$—approximate noise magnitude spectrum
$\bar{d}_1, \bar{d}_2$—compact spectra of the first and second dimension, respectively
$P, P_1, P_2$—dimension, first dimension and second dimension, respectively
$\bar{s}, \bar{n}$—compact spectra of signal and noise respectively (abstracting dimension)
$\bar{s}_1, \bar{n}_1$—compact spectra of the first dimension of the signal and noise respectively
$\bar{s}_2, \bar{n}_2$—compact spectra of the second dimension of the signal and noise respectively
$i=(i_1, i_2, i_3, i_4)$—composite state
$i_1$—speech prototype index $i_2$—noise prototype index
$i_3$—speech gain index
$i_4$—noise gain index
$i_S=(i_1, i_3)$—speech state
$i_N=(i_2, i_4)$—noise state
$i=[i_{ujt}]$—third order state tensor, u—the index for the composite state, j—index of state on the state list in the given frame, t—frame number
$[i_u]=[i_{u**}]$
$[i_j]=[i_{*j*}]$
$[i_t]=[i_{**t}]$
$[i_{t-1}]=b([i_t])$—the (t−1)-th frame state tensor is back-pointed by the t-th frame state tensor, the dependence is time recursive
$i_t^{(l)}$—state history of length l $s_{1_{i_1}}, n_{1_{i_2}}$ prototypes of compact spectra of the first dimension of the speech and noise respectively $s_{2_{i_1}}, n_{2_{i_2}}$ prototypes of compact spectra of the first dimension of the speech and noise respectively
N—frame size
M=N/2+1
L—maximal length of history of observation
$L_A$—look ahead
T—training information
$\{s_i\}_{i \in (N_S)}$, $s_i \in \mathbb{R}^P$—dictionary of speech compact spectra prototypes of the first dimension and of the second dimension,
$\{n_i\}_{i \in (N_N)}$, $n_i \in \mathbb{R}^P$—dictionary of noise compact spectra prototypes of the first dimension and of the second dimension,
$\{c_{s_i}\}_{i \in (N_{cs})}$, $c_{s_i} \in \mathbb{R}_+$—dictionary of speech gains,
$\{c_{n_i}\}_{i \in (N_{cn})}$, $c_{n_i} \in \mathbb{R}_+$—dictionary of noise gains.
$C_S \in \mathbb{R}^{P \times P}$—speech covariance matrix,
$C_N \in \mathbb{R}^{P \times P}$—noise covariance matrix,
$\{P_S^{(l)}\}_{l \in (L)}$—probabilities of the speech state history of length l, where L−1 is the longest history considered,
$\{\lambda_S^{(l)}\}_{l \in (L)}$—smoothing coefficients for probabilities of speech state history of length l,
$\{P_N^{(l)}\}_{l \in (L)}$—probabilities of the noise state history of length l, where L−1 is the longest history considered,
$\{\lambda_N^{(l)}\}_{l \in (L)}$—smoothing coefficients for probabilities of noise state history of length l

The invention claimed is:

1. A method of enhancing distorted signal having a speech and noise component, with a processing device having memory with stored training information (T), comprising:
   acquiring a distorted signal frame r,
   computing an orthogonal transform over the distorted signal frame r to obtain a distorted signal magnitude spectrum d and a distorted signal phase spectrum,
   removing noise in a spectrum domain according to a noise and speech model to obtain a clear amplitude spectrum $\hat{d}_{sk}$ of the frame, and
   synthetizing a clear speech signal $\hat{s}_p$ frame with inverse transformation of the clear amplitude spectrum $\hat{d}_{sk}$ from spectrum domain to time domain,
   wherein the training information T comprises:
      dictionaries of compact spectra prototypes of speech $s_i$, and noise $n_i$,
      speech gains $c_{S_{i_3}}$ and noise gains $c_{N_{i_4}}$ forming together composite
   states $i=(i_1, i_2, i_3, i_4)$, and
   probabilities of speech $P_S^{(l)}$ and noise $P_N^{(l)}$ state history,
wherein the dictionaries of compact spectra prototypes comprise compact spectra
   prototypes of a first dimension $P_1$ and of a second dimension $P_2$, where the second dimension $P_2$ is higher or equal to the first dimension $P_1$, and
wherein the step of removing noise includes:
   computation of a first compact spectrum $\bar{d}_1$ of the first dimension $P_1$ from the magnitude spectrum d,
   computation of a second compact spectrum $\bar{d}_2$ of the second dimension $P_2$ from the magnitude spectrum d,
   preselection from the training information T of a set of composite states matching the first compact spectrum $\bar{d}_1$,
   evaluation of likelihood and transition probabilities of composite states with an a'priori knowledge model using the second compact spectra $\bar{d}_2$ over the set of preselected composite states,
   computing a'posteriori probabilities of the composite states using forward and backward probabilities calculated on a base of the likelihoods of the preselected composite states and on a base of the transition probabilities corresponding to at least three frames,
   estimation of a noise compact spectrum $\hat{d}_{2n}$ based on the second compact spectrum $\bar{d}_2$, the training information T and the a'posteriori probabilities,
   estimation of a speech compact spectrum $\hat{d}_{2s}$ based on the second compact spectrum $\bar{d}_2$, the training information T and the a'posteriori probabilities, and
   recovering a speech magnitude spectrum $\hat{d}_{sk}$ based on the estimated noise compact spectrum, the estimated speech compact spectrum $\hat{d}_{2s}$, the estimated speech compact spectrum $\hat{d}_{2n}$, and the distorted signal magnitude spectrum $\bar{d}_2$.

2. The method according to claim 1, wherein the first dimension $P_1$ of the first compact spectrum is greater than 4 and lower than 10 and the second dimension $P_2$ of the second compact spectrum is greater than 7 and lower than 30.

3. The method according to claim 1, wherein at least one of the estimation of the noise compact spectrum $\hat{d}_{2n}$, and the estimation of the speech compact spectrum $\hat{d}_{2s}$ involves calculation of an expected value over the composite states using a'posteriori probabilities.

4. The method according to claim 1, wherein the training information T comprises noise covariance matrix $C_N$ and speech covariance matrix $C_s$, and
   wherein the step of evaluation of composite states likelihood includes evaluations of log-likelihood of preselected states according to formula:

$$\log[p(\overline{d_2} \mid [i_j])] =$$
$$-\frac{P}{2}\log(2\pi) - \frac{1}{2}\log[\det(c_{s_{i_3}}^2 C_S + c_{n_{i_4}}^2 C_N)] + -\frac{1}{2}(\overline{d_2} - c_{s_{i_3}} \overline{s}_{2_{i_1}} - c_{n_{i_4}} \overline{n}_{2_{i_2}})^T$$
$$(c_{s_{i_3}}^2 C_S + c_{n_{i_4}}^2 C_N)^{-1} (\overline{d_2} - c_{s_{i_3}} \overline{s}_{2_{i_1}} - c_{n_{i_4}} \overline{n}_{2_{i_2}}).$$

5. The method according to claim 4, wherein the evaluations of log-likelihood of preselected states are executed with approximation:

$$\log[p(\overline{d_2} \mid [i_j])] =$$
$$-\frac{P}{2}\log(2\pi) - \frac{P_2}{2}\log(v_{i_3,i_4}) - \frac{1}{2v_{i_3,i_4}} (\|\overline{d_2}\|_2^2 + c_{s_{i_3}}^2 \|\overline{s}_{2_{i_1}}\|_2^2 + c_{N_{i_4}}^2 \|\overline{n}_{2_{i_2}}\|_2^2 +$$
$$2c_{s_{i_3}} c_{n_{i_4}} \langle \overline{s}_{2_{i_1}}, \overline{n}_{2_{i_2}} \rangle - 3c_{s_{i_3}} \langle \overline{s}_{2_{i_1}}, \overline{d}_2 \rangle - 2c_{s_{i_4}} \langle \overline{n}_{2_{i_1}}, \overline{d}_2 \rangle)),$$

where $v_{i_3,i_4}$ represents a maximal eigenvalue of matrix $$c_{s_{i_3}}^2 C_S + c_{n_{i_4}}^2 C_N.$$

6. The method according to claim 5, wherein, for evaluation of log-likelihood of different preselected states i, following terms are calculated once per frame and stored in cache memory:

$$\|\overline{d}\|_2^2, \langle \overline{s}_{2_{i_4}}, \overline{d}_2 \rangle, \langle \overline{n}_{2_{i_4}}, \overline{d}_2 \rangle.$$

7. The method according claim 1, wherein the training information T includes smoothing coefficients, and
wherein evaluation of transition probabilities of composite states includes computing the transition probabilities using smoothing coefficients $\lambda_S^{(t)}, \lambda_N^{(t)}$.

8. A mobile communication device having a battery and arithmetic unit with connected memory, radio transceiver and audio input wherein the device is configured to receive an audio signal from the audio input and execute the method as defined in claim 1 on the audio signal and then transmit a resulting signal with the radio transceiver.

9. The mobile communication device according to claim 8, wherein the training information T is stored in the memory.

10. The mobile communication device according to claim 8, wherein the device is configured to compute the training information T.

11. The communication device according to claim 8, comprising a separate memory for storing terms:

$$\|\overline{d}\|_2^2, \langle \overline{s}_{2_{i_4}}, \overline{d}_2 \rangle, \langle \overline{n}_{2_{i_4}}, \overline{d}_2 \rangle.$$

12. A computer program product embodied on a non-transitory computer readable memory for a use with a mobile communication device having a processing device and a memory, wherein the computer program product comprises a set of instructions that after loading to the memory cause the processing device to execute the method as defined in claim 1.

13. The computer program product according to claim 12, wherein the training information T includes:
dictionaries of compact spectra prototypes of speech $s_{i_1}$, and noise $n_{i_2}$, speech gains $$c_{S_{i_3}}$$

and noise gains $$c_{N_{i_4}}$$

forming together composite states $i=(i_1,i_2,i_3, i_4)$ and probabilities of state history $P_S^{(t)}, P_N^{(t)}$.

14. The computer program product according to claim 13, wherein the training information T comprises noise covariance matrix $C_N$ and speech covariance matrix $C_S$.

15. The computer program product according to claim 11, wherein the training information T comprises smoothing coefficients $\lambda_S^{(t)}, \lambda_N^{(t)}$.

* * * * *